July 4, 1939.  G. L. DIMMICK  2,164,735
PUSH-PULL OPTICAL SYSTEM
Filed July 25, 1936
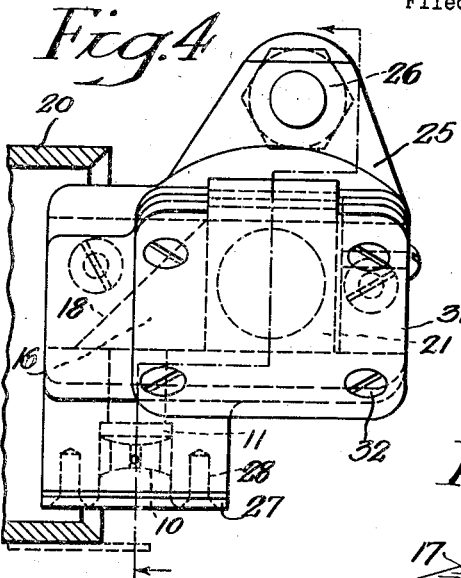
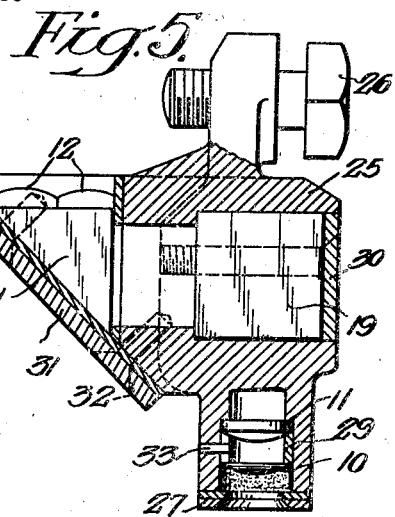
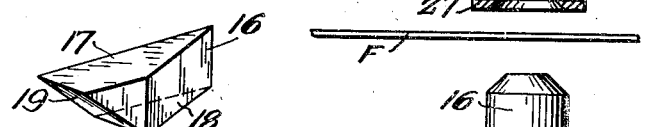
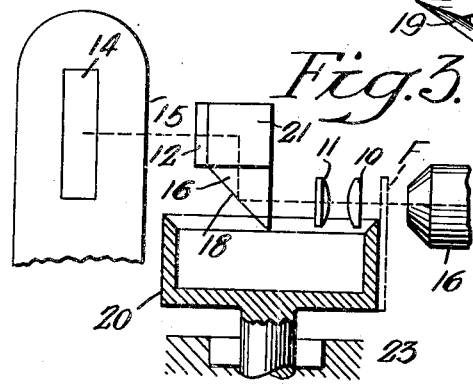
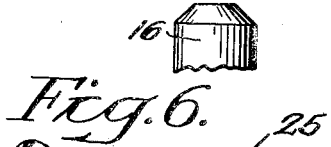
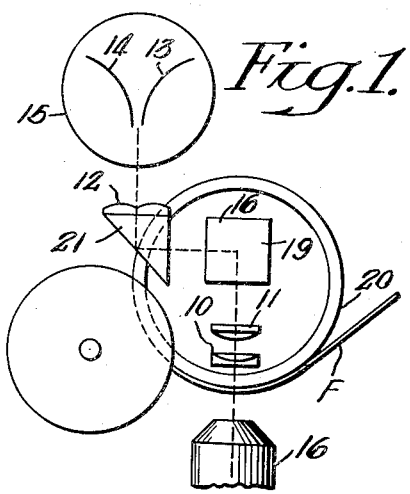
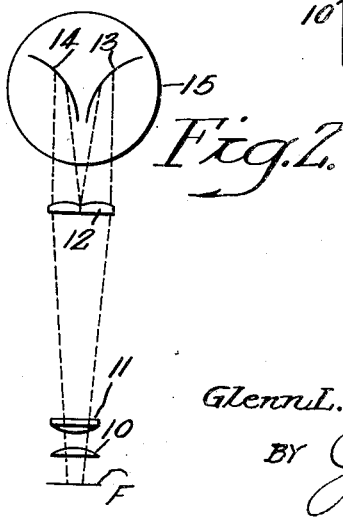
INVENTOR
Glenn L. Dimmick
BY
ATTORNEY.

Patented July 4, 1939

2,164,735

UNITED STATES PATENT OFFICE 2,164,735

PUSH-PULL OPTICAL SYSTEM

Glenn L. Dimmick, Erlton, N. J., assignor to Radio Corporation of America, a corporation of Delaware Application July 25, 1936, Serial No. 92,479

7 Claims. (Cl. 179—100.3)

This invention relates to an optical system for sound reproducers and more particularly to an optical system adapted to function between the film and photocell in a sound reproducer using what is known as a push-pull sound track, i. e., a sound track in which opposite halves of the sound waves are recorded on separate sound track areas.

It is customary in sound reproducing equipment for use in connection with talking motion pictures to use a sound record on film either adjacent to the picture record or on a separate similar film. In the reproduction of such records a fine line of light is focused upon the film, the light is modulated by the photographic sound record on the film, and it is thereafter directed to a photocell or similar slight responsive device which translates the variations in light intensity into corresponding variations in electrical currents which are thereafter amplified and reproduced as sound.

In one form of this apparatus what is known as a "push-pull" sound record is used. In such a record the opposite halves of the sound waves are recorded on separate sound track areas or the entire sound waves 180° apart may be so recorded.

In a modification of this apparatus as described and claimed in my copending application Serial No. 610,302, filed May 9, 1932, issued September 21, 1937, as Patent No. 2,093,423, the separate sound recordings of each half wave are each symmetrical about its own axis and there is no record, i. e., the positive record is substantially opaque, between the half waves.

This invention relates to an optical system for directing light from such a sound record onto a photocell having two cathodes and adapted to operate in a push-pull circuit such, for example, as that described in my application Serial No. 47,969, filed November 2, 1935 issued March 1, 1938 as Patent No. 2,109,453.

One object of my invention is to provide an optical system which will accurately direct the light from each portion of the sound track to the corresponding photocell cathode.

Another object of my invention is to provide such an optical system which will direct the light to the photocell with the minimum loss of light.

Another object of my invention is to provide such an optical system which will direct light from film on a rotating drum to a photocell in a convenient location in relation thereto.

Another object of my invention is to provide such an optical system which will rotate the relative positions of the beams of light 90° about the optical axis in order to facilitate the mounting of the photocell.

Other and incidental objects of my invention will be apparent to those skilled in the art from a reading of the following specification and an inspection of the accompanying drawing in which:

Figure 1 is a diagrammatic illustration of the arrangement of the elements of my optical system, Figure 2 is a vertical section through my optical system arranged in a straight line and with the prisms removed to show the functioning of the lenses, Figure 3 is a view from the left hand side of Fig. 1 or in other words a top view of the optical system, Figure 4 is a view corresponding to Fig. 3 showing a commercial form of my invention, Figure 5 is a view corresponding to Fig. 1 showing a commercial form of my invention, Figure 6 is a view taken from the bottom of Figs. 4 and 5, and Figure 7 shows the hexahedral prism used in Figs. 4, 5 and 6.

Referring first to Fig. 2, showing the lens arrangement: Light passes through the film F in a narrow line and strikes first the cylindrical lens 10 having its axis vertical. It passes thence through the spherical lens 11 to the pair of cylindrical lenses 12 having their axes vertical which, in turn, direct the light to the cathodes 13 and 14 of the photocell 15.

The light is, of course, directed to the film by the usual optical system 6 (Fig. 1) in which light from an exciter lamp of the incandescent coil filament type is directed to a slit and the image of the slit is focused upon the film. It is customary in such optical systems for the condenser lens directing light to the slit to be so focused that an image of the lamp filament is focused in the objective lens.

The combination of the cylindrical lens 10 and the spherical lens 11, which function as a toric lens or which constitute what might be called a toroidal lens, serve to focus a rectangular instead of a linear image upon both the cylindrical lenses 12 and the cathodes 13 and 14.

To be more specific as to the functioning of these lenses: The cylinder and sphere together functioning in a horizontal plane focus an image of the lateral dimensions of the track upon the width of the cylindrical lenses 12, these rays thereafter being converged by the cylindrical lenses 12 in the form of diverging beams on to cathodes 13 and 14. The spherical lens 11, however, functions in the vertical plane in Fig. 2 and, substantially unaffected by the cylindrical lens, collects the beam of light diverging from the film so that it just falls within the dimensions of the cylindrical lenses 12 whence it passes to the cathodes 13 and 14. The combination of lenses, and the photocell position, are so chosen that an image of the exciter lamp filament is focused on each of the cathodes 13 and 14 and this image varies in brightness with the transmission of the sound track, whether that sound track be of the variable density or of the variable area type.

In Figs. 1 and 3 to 6, as compared to Fig. 2 above described, the position of the lenses 12 and the photocell 15 is rotated 90° about the optical axis in relation to the lenses 10 and 11 and the film F by means of the prisms 16 and 21. In these figures the prism 16 is inserted with the upper face 17 thereof in a horizontal position and with the face 18, which is perpendicular to the case 17, at an angle of 45° to the axis of the beam of light passing through the lenses 10 and 11, as shown in Fig. 3.

It will be apparent that reflection from the surface 18 permits the end of prism 16 to be inserted slightly into a rotatable film drum 20 and to direct the light outwardly therefrom, as shown in Fig. 3. Light reflected from the face 18 strikes the face 19 which is at an angle of 45° to both faces 17 and 18, and which therefore reflects the beam of light into the prism 21, causing the light to travel vertically or in the plane of the paper in Fig. 1 or perpendicular to the plane of the paper in Fig. 3. Prism 21 reflects the light again into a horizontal plane and in a direction parallel to the axis of the beam through the lenses 10 and 11 but offset therefrom both vertically and horizontally.

It will be apparent to those skilled in the art that the triple reflection at the surfaces 16 and 19 and in the prism 21 also rotates the beam 90°. In other words, if the beam were not so rotated, then in Fig. 1 the prism 12 would have their axes parallel to instead of perpendicular to the plane of the paper and the photocell 15 would have to be similarly oriented. The arrangement shown is particularly advantageous since the axis of the photocell 15 is parallel to the axis of rotation of the drum 20 and the photocell can therefore be mounted in a socket placed directly on whatever member supports the drum 20, such for example, as the member 23 which may be the center plate of a sound head.

The hexahedral prism 16 may be made in the form of two prisms cemented together, one of them being an ordinary right angle reflecting prism and the other being a 45° reflecting prism, but I prefer to make this prism in one piece as shown in Fig. 7, preferably silvering the surfaces 18 and 19 in order to avoid loss of light where these surfaces come in contact with other objects. It will be apparent to those skilled in the art that if the prism is so mounted that neither the surface 18 nor 19 touch any other surfaces the surfaces may be left unsilvered and will act by total internal reflection.

In the form of the invention shown in Figs. 4 to 6, the several prisms and lenses heretofore described are mounted within a unitary metallic member 25 adapted to be fastened, as for example by the bolt 26, to a sound head or to a bracket thereon. The lenses 10 and 11 are secured in the member 25 by means of a cover plate 27 which is attached by screws 28, and these lenses are separated by an appropriate spacing member 29. The prism 16 is inserted from the bottom and secured by an appropriate cover plate 30, while the prism 21 is inserted from the top, together with its associated lenses 12 and secured in place by the cover plate 31 which is fastened by the screws 32. The cylindrical lens 10 is prevented from rotation by a pin 33 fitting through an aperture in the member 25 and into a slot in the spacer 29 between the lenses 10 and 11.

It will be apparent that the spherical-cylindrical lens combination 10, 11 is useful either with or without a cylindrical lens, such as 12, in conjunction with ordinary or single sound track increasing the light efficiency of the apparatus and converting the beam to a substantially constant area variable intensity beam at the photocell.

It will also be apparent that the utility of my optical system as a whole is not limited to apparatus using a push-pull system, but that it may be used in any system where it is desired to independently reproduce two sound tracks, such, for example, as where the high and low frequencies are recording on separate tracks or where voice is recorded on one track and accompaniment on the other, and so forth.

Having now described my invention, I claim:

1. In combination with sound reproducing apparatus having means for directing a fine line of light upon a film and a light responsive device adapted to be actuated by said light, an optical system for directing light from the film to the photocell, including an exit lens for directing light to the photocell and a toroidal entrance lens for focusing the light in one plane upon the exit lens and restricting the dimensions of the beam in a plane perpendicular thereto.

2. In combination with sound reproducing apparatus having means for directing a fine line of light upon a film and a light responsive device adapted to be actuated by said light, an optical system for directing light from the film to the photocell including a pair of cylindrical lenses having their axes parallel and in the same plane perpendicular to the optical axis of the system for directing light upon the photocell and at least one lens directing light from said film to said pair of lenses.

3. In combination with sound reproducing apparatus having means for directing a fine line of light upon a film and a light responsive device adapted to be actuated by said light, an optical system for directing light from the film to the photocell, including a prism system for rotating the beam of light 90° about the optical axis.

4. In combination with sound reproducing apparatus having means for directing a fine line of light upon a film and a light responsive device adapted to be actuated by said light, an optical system for directing light from the film to the photocell, including a hexahedral prism and an additional reflector for displacing a beam of light laterally and vertically and rotating it 90° around the optical axis.

5. In combination with sound reproducing apparatus having means for directing a fine line of light upon a film and a light responsive device adapted to be actuated by said light, an optical system for directing light from the film to the photocell, including a cylindrical lens and a spherical lens, a prism system for displacing and rotating the beam of light and a pair of positive cylindrical lenses for directing light upon the photocell, the said cylindrical lens converging light in one direction to the dimension of the said pair of cylindrical lenses and the said spherical and cylindrical lenses together focusing an image of the said sound track on the said cylindrical lenses.

6. In combination with sound reproducing apparatus having means for directing a fine line of light upon a film and a light responsive device adapted to be actuated by said light, an optical system for directing light from the film to the photocell, including a cylindrical lens and a spherical lens, a pair of positive cylindrical lenses for directing light upon the photocell, the said cylindrical lens converging light in one direction to the dimension of the said pair of cylindrical lenses and the said spherical and cylindrical lenses together focusing an image of the said sound track on the said cylindrical lenses.

7. In combination with sound reproducing apparatus having means for directing a fine line of light upon a film and a light responsive device adapted to be actuated by said light, an optical system for directing light from the film to the photocell, including a cylindrical lens for directing light upon the photocell, a spherical lens directing the beam in one direction within the dimensions of the photocell and a cylindrical lens in cooperative relation to said spherical lens focusing an image of the sound track in the other direction upon the cylindrical lens.

GLENN L. DIMMICK.